3,391,164
1-AMINO-2-AMINOALKOXY-4-(SUBSTITUTED SULFONAMIDO) - ANTHRAQUINONES AND THEIR QUATERNARY SALTS
James M. Straley, John G. Fisher, and Ralph R. Giles, Kingsport, Tenn., assignors to Eastman Kodak Company, Rochester, N.Y., a corporation of New Jersey
No Drawing. Filed Oct. 24, 1965, Ser. No. 504,986
8 Claims. (Cl. 260—373)

ABSTRACT OF THE DISCLOSURE

1 - aminoanthraquinone compounds substituted in the 4-position with an alkyl-, cycloalkyl- or aryl - sulfonamido group and at the 2-position with an aminoalkoxy group and quaternary salts of such compounds are useful as dyes for acrylic textile materials.

---

This invention relates to new anthraquinone compounds, and their application to the art of dyeing and coloring. More particularly this invention relates to new anthraquinone dyes for acrylic fibers, yarns and fabrics.

Many prior art dyes used to impart color to acrylic and modacrylic fibers are not completely satisfactory in many applications. The prior art dyes which have good affinity to the acrylic fibers may possess poor light fastness properties. On the other hand known dyes which have good light fastness properties may have either poor or no affinity to the acrylic fibers. These observations are readily apparent when the prior art dyes are applied to acrylic fibers.

We have discovered that the anthraquinone compounds having the formula:

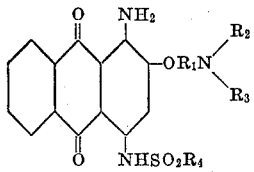

wherein $R_1$ represents lower alkylene groups having from 1 to 4 carbon atoms and hydroxyalkylene groups having from 1 to 4 carbon atoms, $R_2$ and $R_3$ represent hydrogen or lower alkyl groups e.g. alkyl groups having from 1 to 4 carbon atoms including branched alkyl groups and $R_4$ represents a lower alkyl group e.g. an alkyl group having 1 to 4 carbon atoms; a lower alkoxyalkyl group e.g. an alkoxyalkyl group having 3 to 6 carbon atoms; a cycloalkyl group, and a monocyclic carbocyclic aromatic group of the benzene series are valuable dyes for coloring acrylic fibers and textile materials. The quaternary salts of the above compounds are also included within the scope of the invention. These dye compounds when applied to the aforesaid textile materials have good affinity therefore and give red dyeings of high quality. The dyeings obtained on said acrylic materials have excellent fastness to light, atmospheric fumes, washing and sublimation.

These compounds can also be expected to respond favorably to other textile dye tests described in the A.A.T.C.C. Technical Manual, 1964 edition depending in part upon the particular dye used and the fiber being dyed.

The present anthraquinone compounds can be expected to exhibit superior properties compared to anthraquinone compounds with similar substituents in either the 2 or 4 position. In particular they show superior affinity and fastness properties such as previously mentioned.

Ethylene, N - propylene, isopropylene, N - butylene, isobutylene, secondary butylene, N - amylene, isoamylene, N - hexylene, and isohexylene are illustrative of the alkylene groups represented by $R_1$. $\beta$ - Hydroxyethyl, $\beta$ - hydroxypropyl, $\gamma$ - hydroxypropyl, $\beta$ - $\gamma$ - dihydroxypropyl and $\delta$ - hydroxybutyl are illustrative of the hydroxyalkylene groups represented by $R_1$.

Methyl, ethyl, N - propyl, isopropyl, N - butyl, isobutyl, and secondary butyl, are illustrative of the alkyl groups represented by $R_2$, $R_3$ and $R_4$.

Cyclobutyl, cyclopentyl, cyclohexyl and etc. are illustrative of the cycloalkyl groups represented by $R_4$.

Monocyclic carbocyclic groups of the benzene series represented by $R_4$ include phenyl and substituted phenyl such as alkylphenyl, e.g. o,m,p - tolyl; alkoxyphenyl, e.g. o,m,p - methoxyphenyl, halophenyl, e.g. o,m,p - chlorophenyl; nitrophenyl, e.g. o,m,p - nitrophenyl; alkylsulfonylphenyl, e.g. o,m,p - methylsulfonylphenyl; alkylsulfonamidophenyl, e.g. o,m,p - methylsulfonamidophenyl; di(alkylsulfonyl)phenyl, e.g. 2,5 - di(methylsulfonyl)phenyl; dicarboxylicacidimidophenyl, e.g. o,m - succinimidophenyl; fluoroalkylphenyl, e.g. trifluoromethylphenyl; acylamidophenyl, e.g. o,m,p - acetamidophenyl; cyanophenyl, e.g. o,m,p - cyanophenyl; carboxamidophenyl, e.g. o,m,p - carboxamidophenyl; benzamidophenyl; thiocyanophenyl, e.g. o,m,p - thiocyanophenyl; alkylthiophenyl, e.g. o,m,p - methylthiophenyl; benzoxyphenyl, e.g. o,m,p - benzoxyphenyl; benzaminophenyl, e.g. o,m,p-benzaminophenyl; benzylaminophenyl, e.g. o,m,p - benzylaminophenyl; N - alkylbenzaminophenyl, e.g. N - phenylmethylaminophenyl; formylphenyl, e.g. o,m,p - formylphenyl; carbalkoxyphenyl, e.g. o,m,p - carbethoxyphenyl; benzoylphenyl, e.g. o,m,p - benzoylphenyl.

Representative acrylic textile materials which are dyed with the above anthraquinone dyes are homopolymers and copolymers characterized by containing at least about 35% combined acrylonitrile units and up to about 95% acrylonitrile units, and modified, for example, by 85–5% of vinyl pyridine units as described in U.S. Patents 2,990,393 (Re. 25,533) and 3,014,008 (Re. 25,539) or modified by 65–5% of vinylpyrrolidone units, for example, as described by U.S. Patent 2,970,783, or modified with 65–5% acrylic ester or acrylamide units as described in U.S. Patents 2,879,253, 2,879,254 and 2,838,470. Similar amounts of the other polymeric modifiers mentioned above are also useful. A preferred group of the copolymers readily dyeable with the anthraquinone compounds of this invention are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

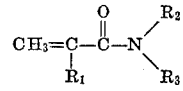

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R_1$, $R_2$ and $R_3$ are as described above. Specific polymers of that group contain 70–95% by weight of (A) a copolymer of from 30–65% by weight of vinylidene chloride and 70–35% by weight of acrylonitrile and (B) 30-5% by weight of a lower N-alkylacrylamide polymer such as poly-N-methacrylamide, poly-N-isopropylacrylamide and poly-N-tertiarybutylacrylamide.

Acrylonilrite materials which are commercially available and which produce fast red shades with the dyes of this invention are the acrylic materials such as Orlon and the modacrylic materials such as Verel.

The new anthraquinone compounds of our invention can be prepared by condensing the appropriately substituted alcohols with 1-amino-4-alkylsulfonamide anthraquinone-2-sulfonic acid or aryl sulfonomido anthraquinone-2-sulfonic acid. The anthraquinone intermediates used in the preparation of these new anthraquinone compounds are prepared from the bromamine acid as described in Example 1 of U.S. Patent 3,072,683, patented Jan. 8, 1963.

The following examples illustrate the anthraquinone compounds of our invention and their preparation.

Example 1

2 grams of 1-amino-4-methanesulfonamido anthraquinone-2-sulfonic acid were added to solution of 5 grams of potassium hydroxide in 30 ml. of 2-dimethylaminoethanol. The reaction mixture was heated and stirred at 80–85° C. for one hour. The reaction mixture was allowed to cool. 300 ml. of water was added and the precipitated dye was collected on a filter. The precipitate obtained was washed by slurrying in hot water. The reaction product, 1-amino-2-(2-dimethylaminoethoxy)-4-methanesulfonamido anthraquinone, dyes acrylic and modacrylic textile materials, such as Orlon on Verel, in red shades.

Example 2

1 gram of 1-amino-4-p-toluenesulfonamido anthraquinone-2-sulfonic acid was added to a solution of 3 grams of potassium hydroxide in 12 ml. of 2-dimethylaminoethanol. The reaction mixture was stirred at 90–95° C. for 6 hrs. and was then allowed to cool. The mixture was drowned in water and acidified to a pH of 6 with hydrochloric acid. The dye was filtered, washed with water and dried at room temperature. 0.85 grams of the dye, 1-amino-2-(2-dimethylamino ethoxy)-4-p-toluenesulfonamido anthraquinone was obtained. It dyes acrylic and modacrylic textile materials, such as Orlon and Verel in red shades.

Example 3

1 gram of 1-amino-4-p-ethylbenzenesulfonamido anthraquinone-2-sodium sulfonate was added to a solution of 3 grams of potassium hydroxide in 15 ml. of 2-dimethylaminoethanol. The solution was stirred and heated on a steam bath for 3½ hours and was then drowned in 300 ml. of water. After adjusting the pH to 6, the product was collected on a funnel and washed with water. The product, 1-amino-2-(2-dimethylaminoethoxy)-4-p-ethylbenzenesulfonamido anthraquinone, imparts red shades to acrylic and modacrylic textile materials which have excellent fastness properties.

In a similar manner other 1-amino-4-arylsulfonamido anthraquinone-2-sulfonates may be reacted with the amino alcohols to obtain compounds which have the above general formula.

Example 4

1 gram of 1-amino-4-methanesulfonamido anthraquinone-2-sodium sulfonate was added to 3 grams of potassium hydroxide dissolved in 20 ml. of 1-N,N-dimethyl-2,3-dihydroxypropylamine. The reaction mixture was heated and stirred for 6 hrs. on a steam bath. The reaction mixture was then drowned in 350 ml. of water and the pH was adjusted to 6. The precipitate was collected on a filter and washed with water to remove any unreacted starting material. The product, 1-amino-2-(1-hydroxy-3-dimethylaminopropoxy)-4-methane-sulfonamido anthraquinone, dyes polyacrylonitrile fibers in fast red shades.

Example 5

1 gram of 1-amino-4-ehanesulfonamido anthraquinone-2-sodium sulfonate was added to a solution of 3 grams of KOH in 15 ml. of 2-dimethylaminoethanol. The reaction mixture was stirred and heated for 3½ hrs. on a steam bath. The reaction mixture was then drowned in 300 ml. of water and the pH was adjusted to 6. The precipitate was collected on a filter, washed with warm water and dried at room temperature. The product, 1-amino-2-(2-dimethylaminoethoxy)-4-ethanesulfonamido anthraquinone, dyes acrylic and modacrylic textile materials, such as Orlon and Verel, in fast red shades.

Following the procedures described hereinbefore, the anthraquinone dye compounds of our invention indicated hereinafter are readily prepared and give red dyes on acrylic fibers and textile materials.

| Ex. | $R_1$ | $R_2$ | $R_3$ | $R_4$ |
| --- | --- | --- | --- | --- |
| 6 | N-propyl | Ethyl | Ethyl | Methyl. |
| 7 | do | N-butyl | N-butyl | Do. |
| 8 | Isopropyl | Ethyl | Ethyl | Do. |
| 9 | Ethyl | H | do | Do. |
| 10 | do | H | Isopropyl | Do. |
| 11 | do | H | t-Butyl | Do. |
| 12 | β-Hydroxypropyl | Methyl | Methyl | Do. |
| 13 | Ethyl | H | do | Do. |
| 14 | do | Ethyl | Ethyl | Do. |
| 15 | do | Methyl | Methyl | Cyclohexyl. |

The quaternization of the compounds obtained by condensing the appropriately substituted alcohols with 1-amino-4-alkyl or aryl sulfonimido anthraquinone-2-sulfonic acid can be carried out in a well-known manner illustrated in the examples below in an inert solvent using the known quaternizing agents.

A dialkyl sulfate, an alkyl chloride, an alkyl bromide, an alkyl iodide, an aralkyl chloride, an aralkyl bromide or an alkyl ester of paratoluene sulfonic acid, for example, can be employed. Specific quaternizing agents include, for example, dimethyl sulfate, diethyl sulfate, dipropyl sulfate, dibutyl sulfate, ethyl bromide, lauryl iodide, benzyl chloride, benzyl bromide, methyl p-toluene sulfonate, ethyl p-toluene sulfonate, n-propyl p-toluene sulfonate and n-butyl p-toluene sulfonate.

The following examples illustrate the quaternization of the anthraquinone compounds of the present invention.

Example 16

.5 gram of the 1-amino-2-(2-dimethylaminoethoxy)-4-methanesulfonamido anthraquinone dye of Example 1 was heated in 10 ml. of dimethyl sulfate at 90–95° C. for 3 hrs. The solution was then poured into a large volume of ether. The precipitated dye was isolated, washed with ether and dried in a vacuum desiccator. The resulting dye imparts red shades to acrylic and modacrylic textile materials.

The product of the above example can be further purified if desired. The dye may be dissolved in hot water, charcoal added and filtered. On addition of sodium iodide the iodide of the dye precipitates.

Example 17

.5 gram of the 1-amino-2-(2-dimethylaminoethoxy)-4-p-toluenesulfonamido anthraquinone dye of Example 2 was dissolved in 20 ml. of chlorobenzene at the boiling temperature. The solution was filtered into a flask containing .5 ml. of dimethylsulfate. The quaternization was completed by heating and stirring on the steam bath for 1.5 hours. After cooling, the precipitated dye was isolated, washed with hexane and purified by dissolving in hot water, adding some charcoal, and filtering. The dyes were subsequently precipitated by addition of NaCl and $ZnCl_2$. This dye imparts red shades to acrylic and modacrylic textile materials, such as Orlon and Verel, which exhibit excellent fastness properties.

Example 18

1 gram of the 1-amino-2-(2-dimethylaminoethoxy)-4-cyclohexanesulfonamido anthraquinone dye of Example 16 and 3 grams of ethyl-p-toluene sulfonate were heated 4 hrs. on the steam bath. After cooling, the mix was ground with 20 cc. of ether, filtered and washed well with about 50 cc. of ether. The resulting dye colors acrylic textile materials, such as Orlon and Verel, in fast red shades.

The dyes of Examples 3–14 can be quaternized in a similar manner to the above quaternized dyes.

In general the new anthraquinone compounds of our invention dye the textile materials red shades having good fastness, for example, to light, gas, atmospheric fumes, washing and sublimation. All the anthraquinone compounds set forth in the preceding tabulation and the examples yield red dyeings on the aforesaid textiles which have the fastness properties just noted. When the anthraquinone compounds are used for dyeing hydrophobic textile materials they should be free of water solubilizing groups such as sulfo and carboxyl groups insofar as they impart water solubility to the dye.

The new anthraquinone compounds of our invention can be used to color the acrylic and modacrylic textile materials mentioned hereinbefore by methods well known to those skilled in the art to which this invention is directed. They may be directly applied to the material undergoing coloration in the form of an aqueous suspension which can be prepared by grinding them to a paste in the presence of a sulfonated oil, soap, sodium lignin sulfonate, or other suitable dispersing agents and dispering the resulting paste in water.

The following example illustrates one way in which the anthraquinone compounds of the invention can be used to dye acrylonitrile polymer textile materials. .1 gram of dye is dissolved by warming in 5 cc. of ethylene glycol monomethyl ether. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried.

The invention has been described in considerable detail with particular reference to certain preferred embodiments thereof, but it will be understood that variations and modifications can be effected within the spirit and scope of the invention as described hereinabove, and as defined in the appened claims.

We claim:

1. An anthraquinone compound having the formula:

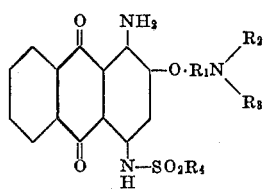

wherein $R_1$ represents lower alkylene or lower hydroxyalkylene, $R_2$ and $R_3$ represent hydrogen or lower alkyl and $R_4$ represents lower alkyl, lower alkoxyalkyl, cyclohexyl, phenyl, or lower alkylphenyl.

2. An anthraquinone compound having the formula:

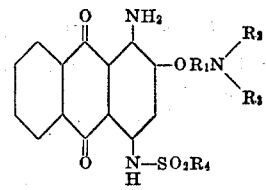

wherein $R_1$ represents a lower alkylene group, $R_2$ and $R_3$ represent lower alkyl groups and $R_4$ represents a lower alkyl group.

3. The anthraquinone compound having the formula:

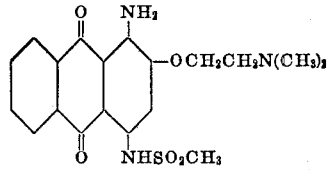

4. The anthraquinone compound having the formula:

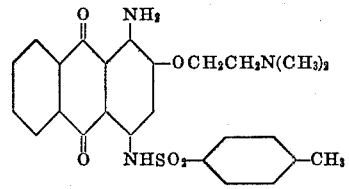

5. The anthraquinone compound having the formula:

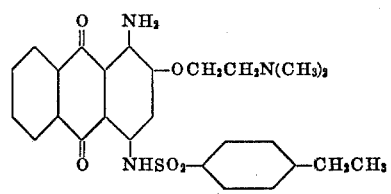

6. The anthraquinone compound having the formula:

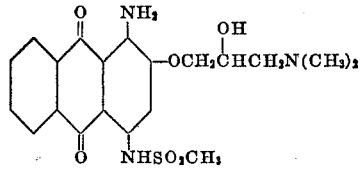

7. The anthraquinone compound having the formula:

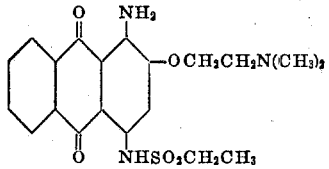

8. An anthraquinone compound having the formula:

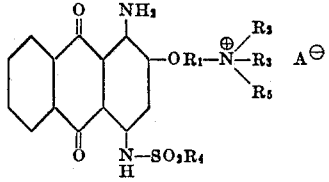

wherein $R_1$ represents lower alkylene or lower hydroxyalkylene, $R_2$ and $R_3$ represent lower alkyl, $R_4$ represents lower alkyl, phenyl or lower alkylphenyl, $R_5$ represents lower alkyl or benzyl, and A represents lower alkylsulfate, chloro, bromo, iodo, or p-toluene sulfonate.

References Cited

UNITED STATES PATENTS

| | | | |
|---|---|---|---|
| 3,072,683 | 1/1963 | Straley et al. | 260—373 X |
| 3,087,773 | 4/1963 | Straley et al. | 260—373 X |
| 3,125,586 | 3/1964 | Katz et al. | 260—380 X |
| 3,324,150 | 6/1967 | Straley et al. | 260—373 |

LORRAINE A. WEINBERGER, *Primary Examiner.*

H. C. WEGNER, *Assistant Examiner.*